United States Patent [19]

Yamasaki et al.

[11] Patent Number: 4,513,049
[45] Date of Patent: Apr. 23, 1985

[54] ELECTRET ARTICLE

[75] Inventors: Kazuyuki Yamasaki, Iwakuni; Fukashi Kagawa, Yamaguchi, both of Japan

[73] Assignee: Mitsui Petrochemical Industries, Ltd., Tokyo, Japan

[21] Appl. No.: 488,890

[22] Filed: Apr. 26, 1983

[51] Int. Cl.$^3$ .............................................. B32B 3/02
[52] U.S. Cl. .................................. 428/194; 179/111 E; 307/400; 428/515; 428/516; 428/520
[58] Field of Search ................ 179/111 E; 428/188, 428/194, 457, 461, 515, 516, 520; 307/400

[56] References Cited

U.S. PATENT DOCUMENTS

| Re. 31,285 | 6/1983 | Turnhout et al. | 428/369 X |
|---|---|---|---|
| 3,118,022 | 1/1964 | Sessler et al. | 179/111 E |
| 3,177,269 | 4/1965 | Nowak et al. | 525/263 |
| 3,483,276 | 12/1969 | Mahlman | 525/240 |
| 3,723,754 | 3/1973 | Murayama et al. | 179/111 E X |
| 3,755,043 | 8/1973 | Igarashi et al. | 179/111 E X |
| 3,862,265 | 1/1975 | Steinkamp et al. | 264/176 R X |
| 3,873,643 | 3/1975 | Wu et al. | 525/193 |
| 3,894,243 | 7/1975 | Edelman et al. | 179/111 E X |
| 3,924,324 | 12/1975 | Kodera | 179/111 E X |
| 3,928,497 | 12/1975 | Iwakuni et al. | 525/285 |
| 3,967,027 | 6/1976 | Igarashi et al. | 428/412 X |
| 4,356,049 | 10/1982 | Tamura et al. | 428/156 X |

FOREIGN PATENT DOCUMENTS

| 104132 | 8/1975 | Japan . |
|---|---|---|
| 28698 | 8/1977 | Japan . |
| 14126 | 2/1978 | Japan . |
| 114417 | 7/1983 | Japan . |

Primary Examiner—Henry F. Epstein
Attorney, Agent, or Firm—Jordan and Hamburg

[57] ABSTRACT

An electret article comprising an even number of electret plastics films laminated together, with the surfaces of the same polarity facing each other, said laminate having the same polarity on both external sides. It keeps its high surface charge density. It will find use in such applications as acoustic materials, filters, and medical supplies.

10 Claims, 4 Drawing Figures

ELECTRET ARTICLE

BACKGROUND OF THE INVENTION

1. Field of the Invention

The present invention relates to a laminate of electret films which is composed such that the films are in intimate contact with each other, with the surfaces of the same polarity facing each other.

2. Description of the Prior Art

Electrets, which are charged or polarized for a long period of time without being supplied with any external energy, are being used or going to find use in the areas of acoustic parts, filters, and medical supplies. They are required to have a high surface charge density and keep the charge for a long period of time. However, electrets tend to lose the charge when they are left in the air. Moreover, the surface charge density decreases still more rapidly when there exist moisture and dust in the air. Thus, it is very difficult to keep electrets stably charged for a long period of time. For this reason, it has been a common practice to fabricate and store electret articles in a place where there is a minimum of moisture and dust.

According to Japanese Laid-open Patent No. 28698/1977, an electret of multilayered laminate structure keeps the charge for a long period of time. Even such an electret does not keep, without difficulty, the initial high charge density at the time when it is formed.

There is known a laminated article composed of an electret and a non-electret material. In such an article, the non-electret material acts merely as a reinforcement and does not effectively prevent the charge density of electret from decreasing.

In the process of forming an electret, one side of the material usually becomes positively charged and the other side, negatively charged. However, in the case of electrostatic acoustic transformers such as microphone, it is required that both sides be charged with the same polarity. According to U.S. Pat. No. 3,924,324, it is possible to obtain a film having the surfaces charged with the same polarity by placing an electret film on a metal plate and heating the metal plate. This method, however, is not preferred to obtain an electret of single polarity having a high charge density, because heating an electret leads to the decay of charge.

Accordingly, it is an object of the present invention to provide an electret article which stably keeps the charge density over a long period of time.

It is another object of this invention to provide an electret article which loses a minimum of its charge density even after it is placed in a humid or dusty environment for fabrication or storage.

It is a further object of this invention to provide an electret article having a high charge density.

It is an even further object of this invention to provide an electret article having charge of the same polarity on both surfaces.

Other and further objects, features and advantages of the invention will appear more fully from the following description taken in connection with the accompanying drawings.

SUMMARY OF THE INVENTION

The elecret article of this invention is composed of an even number of electret films which are laminated such that the surfaces of the same polarity face each other. The external surfaces of the electret article have the same polarity.

DESCRIPTION OF PREFERRED EMBODIMENTS

Figure 1:
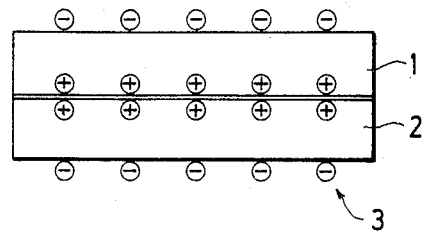
FIG. 1 is a sectional view of an electret article of this invention which was prepared by laminating two sheets of electret plastics films.

The electret article of this invention is a laminate 3 of electret plastics films 1 and 2 which are in intimate contact with each other, as shown in FIG. 1. The electret film is charged or polarized so that one side has a positive charge and the other side a negative charge. Such an electret film can be made of a plastics film by the known methods. Examples of electret films include a thermoelectret produced by heating a film to its melting point or softening point and then cooling it with the application of a DC high voltage; an electroelectret produced by subjecting a film to corona discharge or a pulse high voltage, or by holding a film between two dielectric materials and applying a DC high voltage to both surfaces of the film; a radioelectret produced by irradiating a film with gamma-rays or electron rays; a magnetoelectret produced by melting a film and slowly cooling it in the presence of a strong electromagnetic field; a mechanoelectret produced by pressing a film to cause plastic deformation; and an optoelectret produced by applying a voltage to a film containing a photoconductive substance under the irradiation of light.

Preferable among them is the electroelectret produced by subjecting a film to corona discharge, because it is provided with a high charge density. According to this method, a film heated to a temperature between its glass transition point to its softening point is placed between a pair of electrodes (e.g., between needle electrodes or between a needle electrode and a flat electrode) and a DC high voltage (e.g., 3 to 20 kV) that generates corona discharge is applied across the electrodes. The surfaces of the film are charged or polarized, and the film becomes an electret.

The plastics film from which the electret of this invention is formed is produced from a polar polymer or non-polar polymer having a molecular weight high enough to form a film. For example, a homopolymer or copolymer of alpha-olefin monomer such as ethylene, propylene, butene-1, and 4-methyl-1-pentene a homopolymer or copolymer of vinyl monomer such as styrene, vinyl chloride, acrylic acid, methacrylic acid, vinyl acetate, and methyl methacrylate; a copolymer of the above-mentioned alpha-olefin monomer and the above-mentioned vinyl monomer such as ethylene-acrylic acid copolymer, ethylene-methacrylic acid copolymer, ionomer resin, and ethylene-vinyl acetate copolymer; a polyester or copolyester such as polyethylene terephthalate and polybutylene terephthalate; a polyamide or copolyamide such as nylon 6 and nylon 66; a homopolymer or copolymer of fluorohydrocarbon such as tetrafluoroethylene, hexafluoropropylene, vinyl fluoride, and vinylidene fluoride, and a copolymer thereof with an alpha-olefin; and polycarbonate. Preferable among them are polyethylene, polypropylene, poly-4-methyl-1-pentene, ionomer resin, polyethylene terephthalate, polytetrafluoroethylene, and polyvinylidene fluoride.

The other plastics suitable for producing an electret film are modified polyolefins produced by graft copolymerization of polyolefin with an unsaturated carboxylic acid such as acrylic acid, methacrylic acid, maleic acid, fumaric acid, and itaconic acid, or a derivative thereof such as maleic anhydride, citraconic anhydride, itaconic anhydride, 5-norbornane-2,3-dicarboxylic acid anhydride, methyl acrylate, ethyl methacrylate, butyl acrylate, glycidyl methacrylate, and monomethyl maleate. Such modified polyolefins and their production methods are disclosed in U.S. Pat. Nos. 3,862,265, 3,928,497, 3,873,643, 3,177,269, and 3,483,276.

These modified polyolefins can be used individually or in combination with an unmodified polyolefin. In either case, the content of the unsaturated carboxylic acid or derivative thereof in these resins should be $10^{-4}$ to 10 wt %, if an electret having a high charge density and a high mechanical strength is to be obtained. In addition, the modified polyolefin may be used as at least one layer of the laminated electret article mentioned later, owing to its good heat-bonding to the other plastics. The above-mentioned polymers may be incorporated, as required, with additives such as anti-oxidant, UV absorber, inorganic filler, flame retardant, and plasticizer.

The plastics film or sheet for producing an electret article has a thickness from 1 to 500 micrometers, depending on the object of use of the resulting electret article. In addition, the plastics film may be of unstretched type, uniaxially oriented type, or biaxially oriented type.

There is shown in FIG. 1 an electret laminate 3 composed of two electret films 1 and 2 which are in intimate contact with each other, with the positively charged sides facing each other. The outsides of the laminate are negatively charged. If the two electret films 1 and 2 are brought into intimate contact with each other, with the negatively charged sides facing each other, the outsides of the laminate are positively charged as a matter of course. The electret article of this invention can be produced by laminating four or six electret films. When an even number of electret films are laminated, the outsides of the laminate are charged with the same polarity. On the other hand, if an uneven number of electret films are laminated, the outsides of the laminate are charged with different polarities. This means that the laminate is electrically identical with a single electret film, and it does not present the feature of this invention.

When two electret films are placed one over another, with the sides of the same polarity facing each other, there is a slight electrical repelling action between the two films; but they can be easily brought into intimate contact with each other by the use of a pair of rolls or other pressing means. In this step, the interface of the films should be kept from water, aqueous solution, and other conductive materials. Such foreign matters electrically connect, e.g., short-circuit, the interface of the two films to the outsides of the laminate, causing the surface charge density of the laminate to decrease. Therefore, the edges of the laminate should be properly sealed if the electret article is used in environments where there exist conductive materials; otherwise, the sealing is not required. The sealing may be accomplished by heat sealing, bonding with an adhesive or pressure-sensitive adhesive, or framing. An adhesive may be applied all over the interface, but heat sealing should be applied partially. Overall heat sealing decreases the surface charge density. Good heat sealing can be achieved when one of the two electret films is made of a modified polyolefin mentioned above.

So far, we have mentioned electret articles in the form of flat film. However, the embodiments of this invention include electret articles in the form of concentric tubular films. Such an electret article can be produced by forming an even number of electret films of different diameter and then laminating them by blowing or shrinking.

Figure 3:
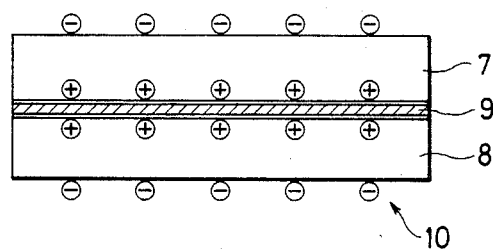
FIG. 3 is a sectional view of another embodiment of this invention in which two electret plastics films are in intimate contact with each other, with a spacer interposed between them.

According to another embodiment of this invention, an even number of electret films are brought into intimate contact with each other, with a spacer interposed between them. There is shown in FIG. 3 a laminate 10 formed by bringing two electret films 7 and 8 into intimate contact with each other, with a spacer 9 interposed between them. The spacer is exemplified by metal foils such as aluminum foil, tin foil, and steel foil; plastics film; adhesive and pressure-sensitive adhesive; and cloth and non-woven fabric. The laminate including a spacer should also be provided with a means to prevent the electrical connection of the laminate interface and the laminate surfaces.

The material and thickness of the electret films constituting the electret article of this invention may be properly selected according to the object of use. Moreover, the electret films may be combined in varied ways. If a flexible electret article is required, flexible thin films should be combined. If an electret article having a high mechanical strength is required, at least one constituting film of the laminate should be selected from stiff films. If a water-resistant or chemical-resistant electret article is required, at least one constituting film of the laminate should be selected from polyolefin films or fluorocarbon plastic films. If the electret article is to be used in applications where heat sealing is required, a film layer having a low melting point should be combined. The spacer may be given the function of reinforcement.

The electret article of this invention is very weak in the external electric field (Volt/meter), but keeps the surface charge density (Coulomb/cm$^2$) stably over a long period of time. Presumably, this is because the charge at the interface of the laminate electrically attracts the charge at the external surfaces, preventing the surface charge density from decreasing.

In the step of forming an electret, the film surface is given electrostatic charge in addition to real electret charge. In the conventional electrets, the electrostatic charge is not utilized but is allowed to disappear naturally. In this invention, however, the electrostatic charge, in addition to real electret charge, can be preserved by laminating the films immediately after the treatment for forming electrets.

The electret article of this invention is formed such that the external surfaces are charged with the same polarity. Owing to this fact coupled with the above-mentioned high surface charge density, it will find use in various applications. For instance, it will be used in the form of flat electret or in the form of slit or split yarns or other fibers having a broad surface area.

Figure 2:
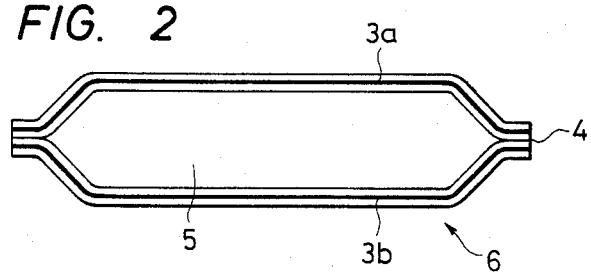
FIG. 2 is a transverse sectional view of a tubular product made of a double-layered electret article of this invention.

One embodiment shown in FIG. 2 is an electret in a tubular form 6. It is produced by heat-sealing both edges 4 of two double-layered films 3a and 3b so that a space is formed at the center 5. This space 5 is utilized as a passage or container for a fluid.

Figure 4:
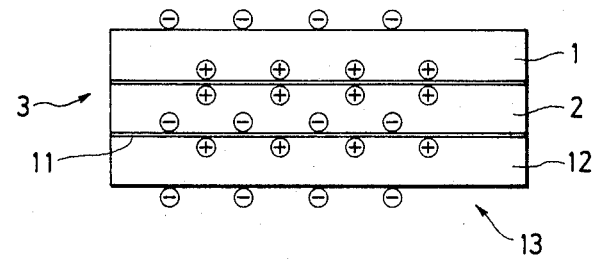
FIG. 4 is a sectional view of another embodiment of this invention in which the electret article of double-layered structure is further laminated with an electret film.

Another embodiment of this invention shown in FIG. 4 is a laminate 13 formed by attaching an electret film 12 to the laminate 3 composed of electret films 1 and 2 which is shown in FIG. 1. It should be noted that the charge on the external surface of the laminate 3 is opposite to that on the internal surface of the electret film 12. Therefore, at the interface 11, the negative charge on the external surface of the laminate 3 is neutralized by the positive charge on the surface of the electret film 12. As the result, the laminate 13 is negatively charged on both sides.

The electret article of this invention will find use as bias power source for condenser microphones, speakers, record cartridges, vibrometers, strain gauges, non-contact switches, air filters, memory elements, and medical supplies.

The invention will be understood more readily by reference to the following examples; however, these examples are intended to illustrate the invention and are not to be construed to limit the scope of the invention.

EXAMPLES 1 to 6 and COMPARATIVE EXAMPLES 1 to 6

Modified polypropylene was prepared by graft copolymerization of maleic anhydride (5 wt %) according to the method disclosed in U.S. Pat. No. 3,928,497. Five parts by weight of this modified polypropylene and 95 parts by weight of unmodified polypropylene were mixed and pelletized using an extruder at 280° C. The pellets were formed into a 40-μm thick and 500-mm wide film using a 65-mm extruder equipped with a T-die at an extrusion temperature of 280° C.

The resulting film was passed, at room temperature at a rate of 10 m/min, across the gap of a pair of brush-type electrodes, one of which was connected to a DC source of −10 kV and the other of which was grounded. The surface charge density measured immediately after production was $+2.5 \times 10^{-7}$ Coulomb/cm$^2$ on one side and $-2.3 \times 10^{-7}$ Coulomb/cm$^2$ on the other side. This electret film is designated as Sample A.

Two sheets of Sample A were laminated by a pair of rolls, with the positively charged surfaces facing each other, and the resulting double-layered film is designated as Sample B. Two sheets of Sample A were laminated by a pair of rolls, with the negatively charged surfaces facing each other, and the resulting double-layered film is designated as Sample C.

The change with time of the surface charge density that took place when Samples A, B, and C were left in the air or dipped in distilled water or physiological saline was measured. For Samples B and C, measurements were carried out after the films were separated. The results are shown in Table 1.

For comparison, the surface charge density was measured for a double-layered film (Sample D) prepared by laminating two sheets of Sample A, with the sides of different polarity facing each other.

The surface charge density was measured as follows: A sample is held between a stationary electrode and a movable electrode. The circuit switch is shorted once and then opened, and the movable electrode is retracted. The induced charge moves to the condenser, generating a potential difference across the terminals of the condenser. This potential difference is measured and the surface charge density is calculated from C×P÷S. where
C:Electrostatic capacity of condenser,
P:Potential difference, and
S:Surface area of electret.

TABLE 1

| Run No. | Sample | Environment* | Polarity | Change with time of surface charge density ($\times 10^{-7}$ Coulomb/cm$^2$) | | |
|---|---|---|---|---|---|---|
| | | | | 0 min. | 3 min. | 24 hrs. |
| Example | | | | | | |
| 1 | B | a | − | 2.3 | 2.3 | 2.2 |
| 2 | C | a | + | 2.5 | 2.4 | 2.4 |
| 3 | B | w | − | 2.4 | — | 1.9 |
| 4 | C | w | + | 2.3 | — | 1.8 |
| 5 | B | p | − | 2.3 | — | 1.8 |
| 6 | C | p | + | 2.4 | — | 1.8 |
| Comparative Example | | | | | | |
| 1 | A | a | + | 2.5 | 2.5 | 2.3 |
| | | | − | 2.3 | 2.3 | 2.2 |
| 2 | D | a | + | 2.4 | 2.3 | 2.3 |
| | | | − | 2.3 | 2.3 | 2.2 |
| 3 | A | w | + | 2.4 | — | 0.09 |
| | | | − | 2.2 | — | 0.07 |
| 4 | D | w | + | 2.5 | — | 0.05 |
| | | | − | 2.3 | — | 0.07 |
| 5 | A | p | + | 2.3 | — | 0.005 |
| | | | − | 2.1 | — | 0.008 |
| 6 | D | p | + | 2.4 | — | 0.006 |
| | | | − | 2.2 | — | 0.004 |

*Environment in which the samples were left prior to measurement.
a: air
w: distilled water
p: physiological saline solution

EXAMPLES 7 to 12 and COMPARATIVE EXAMPLES 7 to 12

Pellets of poly-4-methyl-1-pentene were formed into a 40-μm thick and 500-mm wide film using a 65-mm extruder equipped with a T-die at an extrusion temperature of 300° C. The resulting film was made into an electret as in Example 1. The surface charge density measured immediately after production was $+2.4 \times 10^{-7}$ Coulomb/cm$^2$ on one side and $-2.3 \times 10^{-7}$ Coulomb/cm$^2$ on the other side. This electret film is designated as Sample E.

Two sheets of Sample E were laminated, with the positively charged surfaces facing each other, and the resulting double-layered film is designated as Sample F. Two sheets of Sample E were laminated, with the negatively charged surfaces facing each other, and the resulting double-layered film is designated as Sample G. Two sheets of Sample E were laminated, with the differently charged surfaces facing each other, and the resulting double-layered film is designated as Sample H.

The change with time of the surface charge density was measured. The results are shown in Table 2.

TABLE 2

| Run No. | Sample | Environment | Polarity | Change with time of surface charge density ($\times 10^{-7}$ Coulomb/cm$^2$) | | |
|---|---|---|---|---|---|---|
| | | | | 0 min. | 3 min. | 24 hrs. |
| Example | | | | | | |
| 7 | F | a | − | 2.4 | 2.2 | 2.2 |

TABLE 2-continued

| Run No. | Sample | Environ-ment | Polarity | 0 min. | 3 min. | 24 hrs. |
|---|---|---|---|---|---|---|
| | | | | \multicolumn{3}{c}{Change with time of surface charge density ($\times 10^{-7}$ Coulomb/cm$^2$)} |
| 8 | G | a | + | 2.3 | 2.3 | 2.3 |
| 9 | F | w | − | 2.3 | — | 1.8 |
| 10 | G | w | + | 2.3 | — | 1.7 |
| 11 | F | p | − | 2.3 | — | 1.6 |
| 12 | G | p | + | 2.5 | — | 1.8 |
| Comparative Example | | | | | | |
| 7 | E | a | + | 2.4 | 2.4 | 2.4 |
| | | | − | 2.3 | 2.2 | 2.1 |
| 8 | H | a | + | 2.3 | 2.3 | 2.2 |
| | | | − | 2.3 | 2.2 | 2.2 |
| 9 | E | w | + | 2.3 | — | 0.07 |
| | | | − | 2.3 | — | 0.05 |
| 10 | H | w | + | 2.2 | — | 0.07 |
| | | | − | 2.3 | — | 0.07 |
| 11 | E | p | + | 2.3 | — | 0.003 |
| | | | − | 2.2 | — | 0.004 |
| 12 | H | p | + | 2.2 | — | 0.005 |
| | | | − | 2.1 | — | 0.004 |

EXAMPLES 13 to 18 and COMPARATIVE EXAMPLES 13 to 18

A 40-μm thick polytetrafluorethylene film was subjected to the electret forming treatment as in Example 1. There was obtained an electret film having the surface charge density of $+2.7 \times 10^{-7}$ Coulomb/cm$^2$ on one side and $-2.6 \times 10^{-7}$ Coulomb/cm$^2$ on the other side. This electret film is designated as Sample I.

Sample I was laminated with Sample A (obtained in Example 1), with the positively charged surfaces facing each other (Sample J), with the negatively charged surfaces facing each other (Sample K), and with the differently charged surfaces facing each other (Sample L).

The change with time of the surface charge density was measured. The results are shown in Table 3.

TABLE 3

| Run No. | Sample | Environ-ment | Polarity** | 0 min. | 3 min. | 24 hrs. |
|---|---|---|---|---|---|---|
| Example | | | | | | |
| 13 | J | a | − | 2.6 | 2.6 | 2.4 |
| 14 | K | a | + | 2.7 | 2.6 | 2.5 |
| 15 | J | w | − | 2.6 | — | 1.7 |
| 16 | K | w | + | 2.6 | — | 1.7 |
| 17 | J | p | − | 2.4 | — | 1.5 |
| 18 | K | p | + | 2.6 | — | 1.4 |
| Comparative Example | | | | | | |
| 13 | I | a | + | 2.7 | 2.6 | 2.5 |
| | | | − | 2.6 | 2.6 | 2.5 |
| 14 | L | a | + | 2.6 | 2.6 | 2.4 |
| | | | − | 2.3 | 2.2 | 2.2 |
| 15 | I | w | + | 2.6 | — | 0.04 |
| | | | − | 2.2 | — | 0.04 |
| 16 | L | w | + | 2.5 | — | 0.07 |
| | | | − | 2.3 | — | 0.05 |
| 17 | I | p | + | 2.7 | — | 0.006 |
| 18 | L | p | − | 2.3 | — | 0.007 |
| | | | + | 2.7 | — | 0.008 |
| | | | − | 2.4 | — | 0.007 |

**The surface polarity on Sample I of the laminate was measured.

EXAMPLES 19 and 20

The double-layered film (Sample B) obtained in Example 1 was laminated with the electret film (Sample A) to give a laminate as shown in FIG. 4. The resulting laminate (Sample M) was left in the air or dipped in distilled water for 24 hours, and the surface charge density on both external sides was measured. The results are shown in Table 4.

TABLE 4

| Run No. | Sample | Environ-ment | Polarity | 0 min. | 3 min. | 24 hrs. |
|---|---|---|---|---|---|---|
| Example | | | | | | |
| 19 | M | a | — | 2.3 | 2.3 | 2.2 |
| 20 | M | w | — | 2.3 | — | 1.8 |

What is claimed is:

1. An electret article comprising a laminate of a plurality of electret plastics films, said films being laminated together, the number of films in said plurality of films being an even number, with the juxtaposed internal surfaces of said films facing each other within said laminate being of the same polarity, said laminate having the same polarity on both external surfaces, each of said films having opposite polarities on opposite surfaces.

2. An electret article as claimed in claim 1, wherein the edges of the laminate are tightly sealed.

3. An electret article as claimed in claim 1, wherein the edges of the laminate are heat-sealed.

4. An electret article as claimed in claim 1, wherein the even number of electret plastics films are laminated together with a spacer in the form of foil, film or sheet being interposed between each pair of juxtaposed electret plastics films.

5. An electret article as claimed in claim 4, wherein the spacer is one which is selected from a metal foil, plastics film, adhesive, pressure-sensitive adhesive, woven cloth, and non-woven fabric.

6. An electret article as claimed in claim 1, wherein the plastics film is a polyolefin film.

7. An electret article as claimed in claim 1, wherein the plastics film is a film of modified polyolefin prepared by graft copolymerization of polyolefin with an unsaturated carboxylic acid or a derivative thereof.

8. An electret article as claimed in claim 1, wherein the plastics film is a film of a mixture of unmodified polyolefin and a modified polyolefin prepared by graft copolymerization of polyolefin with an unsaturated carboxylic acid or a derivative thereof.

9. An electret article as claimed in claim 1, wherein the plastics film is a polyester film.

10. An electret article as claimed in claim 1, wherein the plastics film is a film of fluorocarbon polymer.

* * * * *